(12) United States Patent
Ghassempour Aghamolki et al.

(10) Patent No.: US 12,230,963 B2
(45) Date of Patent: Feb. 18, 2025

(54) SWITCH DEVICE FOR A DISTRIBUTION NETWORK FED BY MORE THAN ONE INDEPENDENT POWER SOURCE

(71) Applicant: Eaton Intelligent Power Limited, Dublin (IE)

(72) Inventors: Hossein Ghassempour Aghamolki, Edina, MN (US); Swaroop Gajare, Cranberry Township, PA (US); Amal Thomas, Changanassery (IN); Amit Govind Kolge, Pune (IN)

(73) Assignee: Eaton Intelligent Power Limited, Dublin (IE)

( * ) Notice: Subject to any disclaimer, the term of this patent is extended or adjusted under 35 U.S.C. 154(b) by 183 days.

(21) Appl. No.: 17/960,273

(22) Filed: Oct. 5, 2022

(65) Prior Publication Data

US 2023/0138521 A1  May 4, 2023

Related U.S. Application Data

(60) Provisional application No. 63/272,944, filed on Oct. 28, 2021.

(51) Int. Cl.
*H02J 3/14* (2006.01)
*H02J 3/00* (2006.01)
*H02J 3/04* (2006.01)

(52) U.S. Cl.
CPC ............ *H02J 3/144* (2020.01); *H02J 3/001* (2020.01); *H02J 3/04* (2013.01); *H02J 3/14* (2013.01)

(58) Field of Classification Search
CPC .... H02J 3/144; H02J 3/001; H02J 3/04; H02J 3/14; H02J 3/16; H02J 3/18; H02J 3/381;
(Continued)

(56) References Cited

U.S. PATENT DOCUMENTS 6,504,693 B1   1/2003  Moffat et al.
6,671,151 B2  12/2003  Smith et al.
(Continued)

FOREIGN PATENT DOCUMENTS

| CN | 104836455 A | 8/2015 |
| JP | 4519337 B2 | 5/2010 |
| JP | 2014017947 A | 1/2014 |
| JP | 2014023303 A | 2/2014 |

OTHER PUBLICATIONS

Avinash Aithal et al. "Performance of an electrical distribution network with Soft Open Point during a grid side AC fault" Applied Energy. vol. 227. pp. 262-272. ISSN 0306-2619. Accessible at: https://www.sciencedirect.com/science/article/pii/S0306261917311686 (2018).
(Continued)

*Primary Examiner* — Richard Tan
(74) *Attorney, Agent, or Firm* — DiBerardino McGovern IP Group LLC

(57) ABSTRACT

A switch device includes: a resettable switching apparatus, the resettable switching apparatus is configured control an electrical connection between a first electrical feeder of an electrical distribution network and a load; and a controller configured to: cause a test signal to be provided to the first electrical feeder; determine, after a test signal is provided to the first electrical feeder, whether the electrical distribution network has a radial structure; and if the electrical distribution network has a radial structure, open the resettable switching apparatus to disconnect the load from the first electrical feeder of the electrical distribution network. The electrical distribution network receives alternating current (AC) electrical power from at least two independent AC power sources.

20 Claims, 10 Drawing Sheets

(58) Field of Classification Search
CPC ... H02J 3/46; H02J 13/00002; H02J 13/00034
USPC .......................................................... 307/87
See application file for complete search history.

(56) References Cited

U.S. PATENT DOCUMENTS

| | | | |
|---|---|---|---|
| 10,096,991 B2 | 10/2018 | Smith et al. | |
| 2006/0165023 A1 | 7/2006 | Faulkner et al. | |
| 2007/0086133 A1 | 4/2007 | Loucks et al. | |
| 2015/0124358 A1 | 5/2015 | Hulse | |
| 2017/0331274 A1* | 11/2017 | Akke | G01R 31/086 |

OTHER PUBLICATIONS

N. Vineeth et al. "High Impedance Fault detection in Low Voltage Distribution Systems Using Wavelet and Harmonic Fault Indices" 2020 IEEE International Conference on Power Electronics. Smart Grid and Renewable Energy (PESGRE2020). Cochin, India. pp. 1-6. (2020).

Nigel Ramon Jordan. "Integration of network protector relays on downtown distribution networks with penetration of renewable energy." LSU Master's Theses. 2647. 101 total pages. (2014).

P. Mohammadi et al. "Challenges of PV Integration in Low-Voltage Secondary Networks," in IEEE Transactions on Power Delivery. vol. 32, No. 1. pp. 525-535. doi: 10.1109/TPWRD.2016.2556692. (Feb. 2017).

T.E. McDermott et al. "Relaying for Distribution and Microgrids Evolving from Radial to Bidirectional Power Flow." PNNL-29145. 90 total pages. (Sep. 2019).

Temitayo O. Olowu, et al. "Future Challenges and Mitigation Methods for High Photovoltaic Penetration: A Survey." Energies. 1782. doi:10.3390/en11071782. 32 total pages. (2018).

Wanyu Cao et al. "Operating principle of Soft Open Points for electrical distribution network operation" Applied Energy. vol. 164. ISSN 0306-2619. Accessible at: https://www.sciencedirect.com/science/article/pii/S0306261915015718. pp. 245-257. (2016).

\* cited by examiner

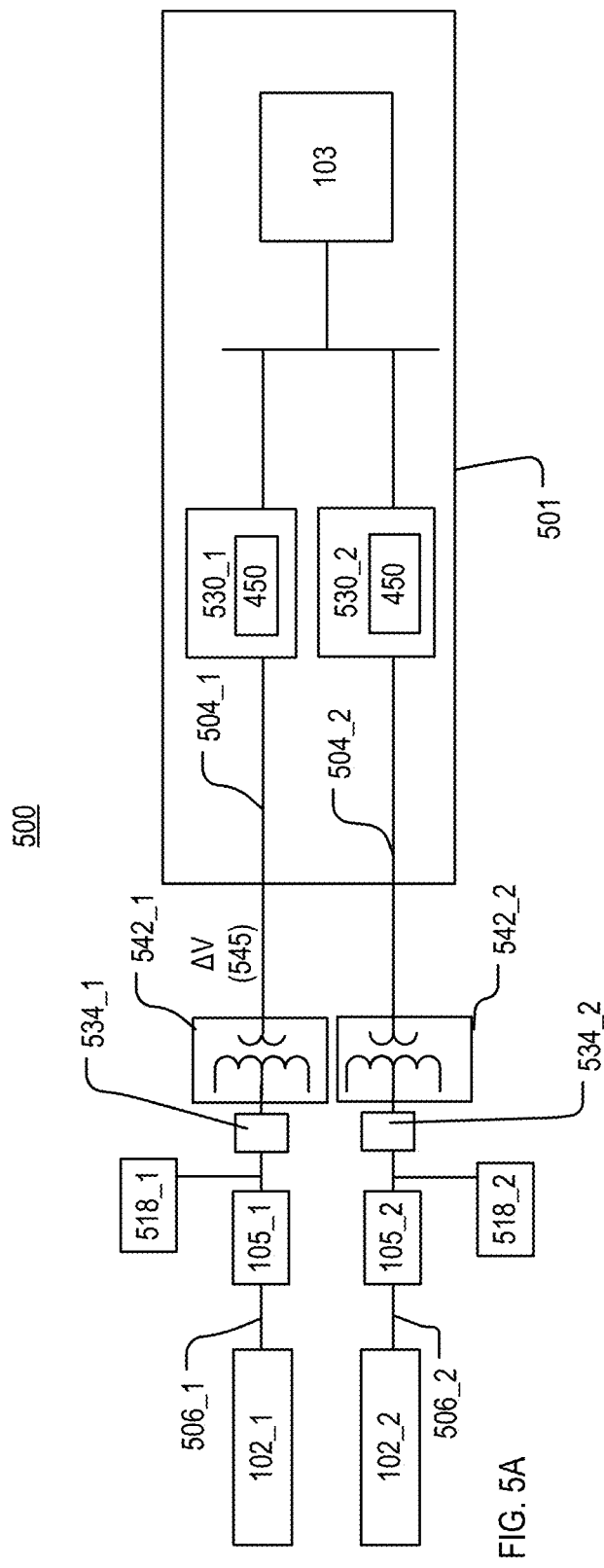
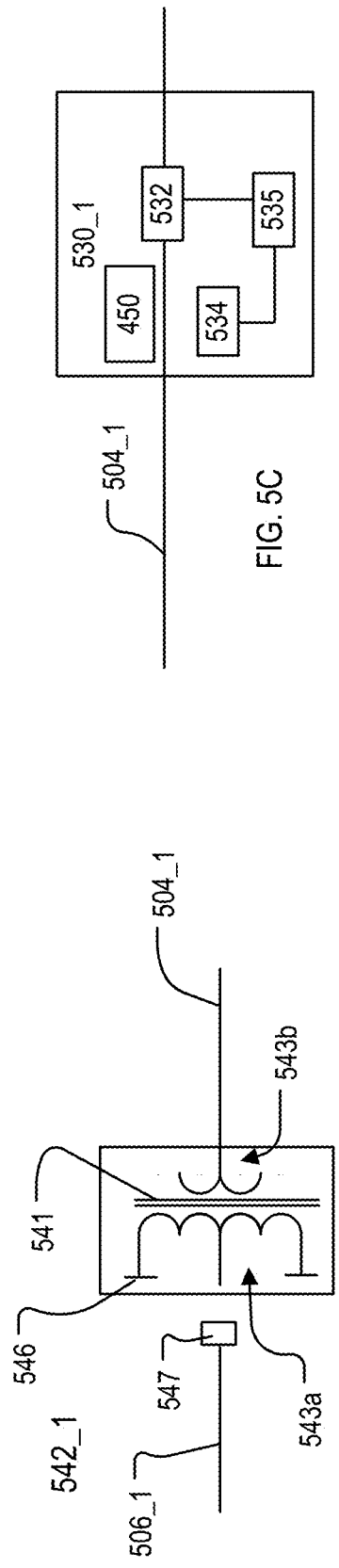
FIG. 5A
FIG. 5B
FIG. 5C

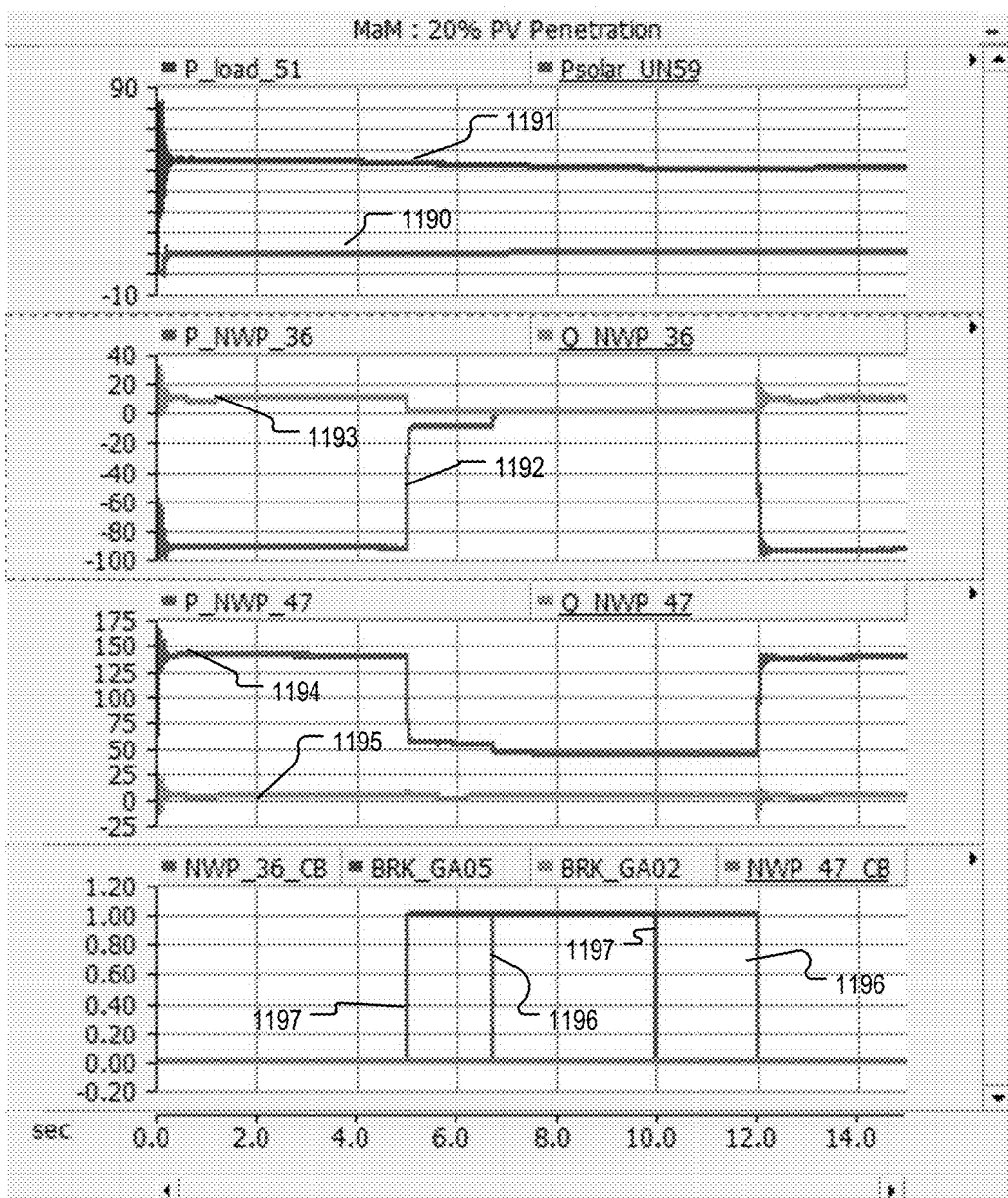

SWITCH DEVICE FOR A DISTRIBUTION NETWORK FED BY MORE THAN ONE INDEPENDENT POWER SOURCE

CROSS-REFERENCE TO RELATED APPLICATION

This application claims the benefit of U.S. Provisional Application No. 63/272,944, filed on Oct. 28, 2021 and titled SWITCH DEVICE FOR A DISTRIBUTION NETWORK FED BY MORE THAN ONE INDEPENDENT POWER SOURCE, which is incorporated herein by reference in its entirety.

TECHNICAL FIELD

This disclosure relates to a switch device for a distribution network that is fed by more than one independent power source.

BACKGROUND

A switch device includes a resettable switching apparatus and may be electrically connected to a feeder in a distribution system to control an electrical connection between a load and the feeder.

SUMMARY

In one aspect, a system includes a switch device. The switch device includes a resettable switching apparatus configured to control an electrical connection between a first electrical feeder of an electrical distribution network and a load; and a controller configured to: determine, after a test signal is provided to the electrical distribution network, whether the electrical distribution network has a radial structure; and if the electrical distribution network has a radial structure, open the resettable switching apparatus to disconnect the load from the first electrical feeder of the electrical distribution network. The electrical distribution network includes a plurality of feeders, at least one of which is configured to be fed by a separate electrical source than at least one other of the plurality of feeders.

Implementations may include one or more of the following features.

The switch device also may include a sensor configured to measure one or more electrical properties of electrical power in the first electrical feeder, and the controller may be further configured to: determine whether there is a change in at least one measured electrical property; and if there is a change in at least one electrical property, cause the test signal to be provided to the electrical distribution network. The one or more electrical properties may include any of current flow direction, voltage magnitude, voltage phase angle, active power, reactive power, and impedance.

The controller may be further configured to cause the test signal to be provided the electrical distribution network by controlling a distribution transformer electrically connected to the first electrical feeder to perform a tap change operation, and, to determine whether the electrical distribution network has a radial structure, the controller may compare a voltage on a source side of the distribution transformer after the tap change operation to the voltage on the source side of the distribution transformer before the tap change operation. The tap change operation may be associated with a tap step voltage. In these implementations, if the voltage on the source side changes by the tap step voltage, the distribution network is determined to have a radial structure, and if the voltage on the source side does not change by the tap step voltage, the distribution network is determined to have a mesh structure. The system also may include the distribution transformer.

In some implementations, the controller is further configured to cause the test signal to be provided to the first electrical feeder by controlling a reactive power generation apparatus to inject the test signal into the electrical distribution network, the test signal having a known amount of reactive power; and, to determine whether the electrical distribution network has a radial structure, the controller is configured to: compare an amount of reactive power on a first side of the reactive power generation apparatus after the test signal is provided to the first electrical feeder to an amount of reactive power on the first side of the reactive power generation apparatus before the test signal was provided. The system may include the reactive power generation apparatus. The reactive power generation apparatus may be a capacitor bank or an inverter.

The controller also may be configured to: determine whether the resettable switching apparatus is open; if the resettable switching apparatus is open, compare a magnitude of a voltage vector on a source side of the distribution transformer to a magnitude of a voltage vector on a network side of the distribution transformer; and determine whether to close the resettable switching apparatus based on the comparison.

The switch device may be a network protector, and the resettable switching apparatus may be configured to control an electrical connection between a distribution transformer and the first electrical feeder; the electrical distribution network may be a secondary electrical distribution network; the controller may be configured to determine whether the secondary electrical distribution network has a radial structure; and, if the secondary electrical distribution network has a radial structure, the controller may be configured to open the resettable switching apparatus.

The switch device may be a switchgear.

The load may include one or more distributed energy resources.

The first electrical feeder may be a medium-voltage electrical feeder, and the resettable switching apparatus may be configured to control the electrical connection between the medium-voltage electrical feeder and the load.

In another aspect, a switch device includes: a resettable switching apparatus, the resettable switching apparatus is configured control an electrical connection between a first electrical feeder of an electrical distribution network and a load; and a controller configured to: cause a test signal to be provided to the first electrical feeder; determine, after a test signal is provided to the first electrical feeder, whether the electrical distribution network has a radial structure; and if the electrical distribution network has a radial structure, open the resettable switching apparatus to disconnect the load from the first electrical feeder of the electrical distribution network. The electrical distribution network receives alternating current (AC) electrical power from at least two independent AC power sources Implementations may include one or more of the following features.

The switch device may be a network protector.

The switch device may be a recloser or a switchgear configured for use in a medium-voltage or high-voltage network.

In another aspect, a method of determining a structure of an electrical distribution network fed by at least two independent alternating current (AC) electrical power sources includes: causing a test signal to be provided to a first electrical feeder of an electrical distribution network; analyzing a response of the electrical distribution system to the test signal to determine a structure of the electrical distribution network; and declaring an abnormal condition in the electrical distribution network if the determined structure is a radial structure.

Implementations of any of the techniques described herein may a system, a switch device, a controller, a method, a process, or executable instructions stored on a machine-readable medium. The details of one or more implementations are set forth in the accompanying drawings and the description below. Other features will be apparent from the description and drawings, and from the claims.

DRAWING DESCRIPTION

FIG. 5A is a block diagram of another example of an electrical power system.

FIG. 5B is a block diagram of an example of a distribution transformer.

FIG. 5C is a block diagram of an example of a network protector.

FIGS. 11A-11D show examples of simulated data.

DETAILED DESCRIPTION

Figure 1:
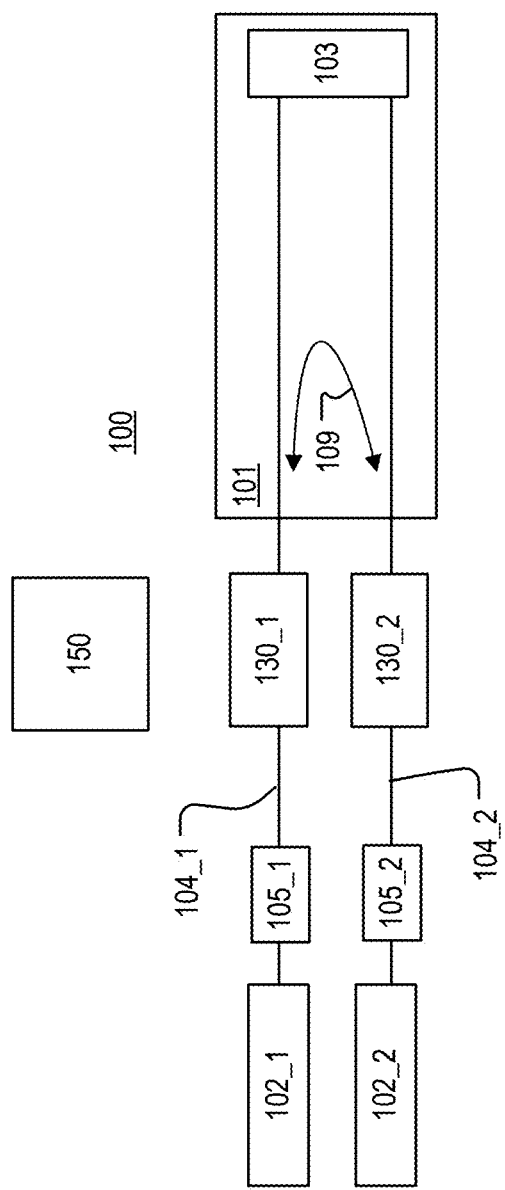
FIG. 1 is a block diagram of an example of an electrical power system.

FIG. 1 is a block diagram of an example of an electrical power system 100. The power system 100 may be a single-phase power system or a multi-phase (for example, three-phase) power system. A single phase is shown in FIG. 1 for simplicity.

The electrical power system 100 includes an electrical power distribution network 101, feeders 104_1 and 104_2, switch devices 130_1 and 130_2, and a controller 150. The feeders 104_1 and 104_2 transfer AC electrical power from respective alternating current (AC) power sources 102_1 and 102_2 to electrical loads 103. The switch device 130_1 controls an electrical connection between the loads 103 and the feeder 104_1, and the switch device 130_2 controls the electrical connection between the loads 103 and the feeder 104_1. The AC power sources 102_1 and 102_2 are independent power sources and provide redundancy to the system 100. For example, if the AC power source 102_1 malfunctions or is unable to produce AC power, the AC power source 102_2 continues to provide electricity to the loads 103. This reduces or eliminates interruptions in the supply of electricity to the loads 103 and results in the system 100 being well-suited for use with critical and/or sensitive loads such as, for example, hospitals, municipal utility facilities, data centers, airports, and transportation facilities. However, the AC power sources 102_1 and 102_2 may produce AC power having different characteristics. For example, an AC voltage produced by the power source 102_1 may have different magnitude and/or phase than an AC voltage produced by the power source 102_2. The differences may cause a circulating current 109 to flow in the distribution network 101.

In a traditional configuration of an electrical distribution system, it is assumed that power flows from the sources to the loads under expected or ordinary conditions, and that reverse power flow (for example, a current that flows from the loads to the sources) is an indication of an abnormal condition. Switch devices in a traditional configuration are configured to open based on detection of power flowing from the load to the source, even if the reverse flow is caused by a circulating current that does not arise from an abnormal operating condition. Moreover, switch devices configured in the traditional manner only reclose when conditions in the system indicate that power flow from the sources to the load is guaranteed and the characteristics of the power produced by the AC sources are the same or similar to within an acceptable tolerance range. For example, a traditional controller may be configured to reclose a switch device only when the phase angle of the voltage on the source side is the same as or is larger than the phase angle of the voltage on the load side.

On the other hand, in the system 100, the controller 150 is configured to determine whether or not the distribution network 101 is in an abnormal condition by determining the structure of the distribution network 101. Under normal or expected operating conditions, source-side circuit breakers 105_1 and 105_2 are closed, and the distribution network 101 has a mesh or loop structure. During an abnormal operating condition, such as an overcurrent or overvoltage condition, at least one of the breakers 105_1, 105_2 is open, and the distribution network 101 has a radial structure. Thus, by determining whether or not the distribution network 101 has a radial structure, the controller 150 also determines whether the electrical distribution network 101 has an abnormal condition directly and without relying on an assumption that reverse power flow indicates a fault condition.

Various techniques for determining the structure of the distribution network 101 are discussed below. Regardless of the specific approach used to determine the structure of the distribution network 101, the configuration of the controller 150 results in improved performance of the system 100 and greater utility for the switch devices 130_1 and 130_2 as compared to the traditional approach of assuming that reverse power flow indicates an abnormal condition. For example, the structure-determination approach provided by the controller 150 allows a circulating current to flow in the electrical power distribution network 101 so long as the circulating current occurs under normal or expected operating conditions. As a result, there are fewer unnecessary operations of the switch devices 130_1 and 130_2, fewer service interruptions for customers, and the performance and efficiency of the system 100 and the switch devices 130_1 and 130_2 is improved.

Prior to discussing the controller 150 in more detail, an overview of the system 100 is provided.

The switch devices 130_1 and 130_2 may be any type of switch that is capable of repeatedly controlling the electrical connection between the respective feeder 104_1 and 104_2 and the loads 103. For example, the switch devices 130_1 and 130_2 may be network protectors, reclosers, or switchgears.

Each power source 102_1 and 102_2 is an AC power source that operates at a fundamental frequency of, for example, 50 or 60 Hertz (Hz). For example, each of the sources 102_1 and 102_2 may be a generator, a power plant, an electrical substation, or a renewable energy source. The power sources 102_1 and 102_2 may be low-voltage (for example, up to 1 kV), medium-voltage or distribution voltage (for example, between 1 kV and 35 kV), or high-voltage (for example, 35 kV and greater) AC power sources. The voltage ranges provided for low-voltage, medium-voltage, distribution voltage, and high-voltage are examples, and an AC source that has an operating voltage in one of the provided ranges may be used as the power sources 102_1 and 102_2 even if the operating voltage of that power source is referred to by a different term. Moreover, the power sources 102_1 and 102_2 may receive power from other electrical power sources that are not shown in FIG. 1. For example, each of the power sources 102_1 and 102_2 may be a medium-voltage substation that receives and transforms high-voltage AC power into medium-voltage AC power that is provided to the respective feeders 104_1 and 104_2.

The loads 103 may be any type of device, system, or component that uses electricity. The loads 103 may be a single load item or a collection of load items. For example, the loads 103 may be or include a motor, a lighting system, an industrial system, a climate controller, or a distributed energy resource (DER). A DER is an electricity-producing resource and/or a controllable load. Examples of DER include, for example, solar panels; wind turbines; combined heat and power plants; rechargeable sources (such as batteries); natural gas-fueled generators; electric vehicles; and controllable loads, such as, for example, some heating, ventilation, air conditioning (HVAC) systems and electric water heaters.

Figure 2:
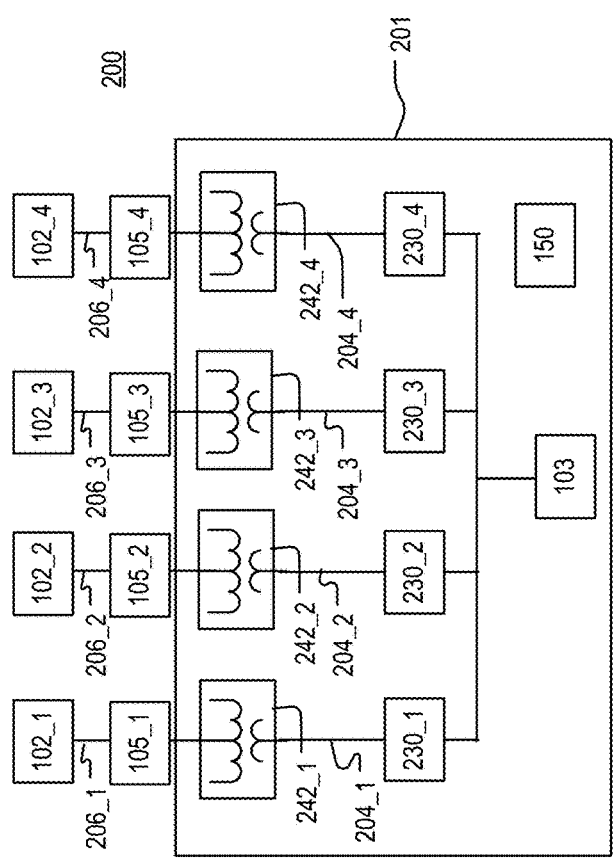
FIG. 2 is a block diagram of an example of a spot network.

The electrical power distribution network 101 may be a low-voltage network, such as a secondary electrical distribution network (a spot network or an area network). In a spot network, two or more feeders are connected in parallel to a common bus to provide power to a specific location or spot. FIG. 2 is a block diagram of an electrical power system 200 that includes a spot network 201. The spot network 201 includes four parallel low-voltage feeders 204_1, 204_2, 204_3, 204_4 that are all connected to a spot, which is the loads 103 in the example of FIG. 2. The loads 103 may be, for example, a variety of electrical loads that are all within one large building or location, such as an airport terminal, a hospital, or an apartment building.

The spot network 201 receives electrical power from four medium-voltage feeders 206_1, 206_2, 206_3, 206_4 that are fed by respective independent AC power sources 102_1, 102_2, 102_3, and 102_4. The feeders 206_1, 206_2, 206_3, 206_4 include respective circuit breakers 105_1, 105_2, 105_3, and 105_4 that open in the presence of an abnormal condition, such as a fault (for example, an over-voltage or over-current condition) or scheduled maintenance.

Each medium-voltage feeder 206_1, 206_2, 203_3, 206_4 is electrically connected to a primary side of a respective distribution transformer 242_1, 242_3, 242_3, 242_4. A distribution transformer is a transformer performs a voltage transformation at an end point or node of a distribution grid. For example, a distribution transformer may convert the voltage on the feeders 206_1, 206_2, 206_3, 206_4 to a voltage that is suitable for general household, industrial, and/or commercial use. The voltage at on each feeder 206_1, 206_2, 206_3, 206_4 and at the primary side of each respective distribution transformer 242_1, 242_3, 242_3, 242_4 is determined by the voltage of the respective source 102_1, 102_2, 102_3, 102_4. The distribution transformers 242_1, 242_3, 242_3, 242_4 step down (reduce) the voltage from the respective sources 102_1, 102_2, 102_3, 102_4 such that the voltage at a secondary side of each transformer is lower than the voltage at the primary side. The voltage at the primary side of the distribution transformers may be, for example, between 1 kV and 35 kV, and the voltage at the secondary side of the distribution transformers may be, for example, 240 V, 480 V, or 600 V.

The secondary side of each distribution transformer 242_1, 242_3, 242_3, 242_4 is electrically connected to a respective low-voltage feeder 204_1, 204_2, 204_3, 204_4. Respective switch devices 230_1, 230_2, 230_3, 230_4 control the electrical connection between the loads 103 and each low-voltage feeder 204_1, 204_2, 204_3, 204_4. The operation of the switch devices 230_1, 230_2, 230_3, 230_4 is controlled by the controller 150. Although the controller 150 is shown as a single element, in some implementations, each switch device 230_1, 230_2, 230_3, 230_4 has a dedicated local controller that controls the operations of that switch device. In these implementations, the spot network 201 includes four instances of the controller 150, and each instance of the controller is associated with one switch device. Each switch device 230_1, 230_2, 230_3, 230_4 may be, for example, a network protector. In implementations in which the switch devices 230_1, 230_2, 230_3, 230_4 are network protectors, each network protector may have a dedicated local controller. Although the controller 150 is shown as a single element, in some implementations, each switch device 130 has a dedicated local controller.

Figure 3:
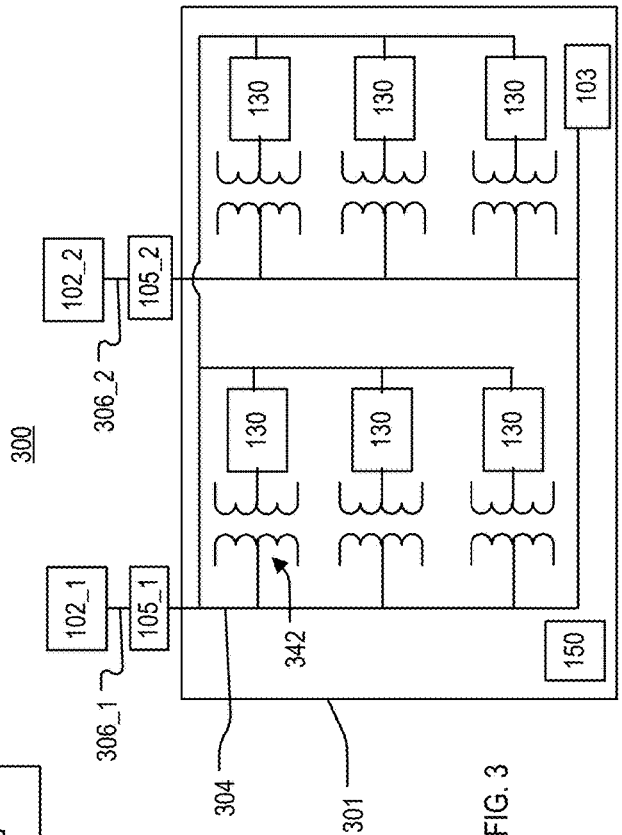
FIG. 3 is a block diagram of an example of an area network.

FIG. 3 is a block diagram of a power system 300 that includes an area network 301. The area network 301 includes redundant feeders 304 (only one of which is labeled), switch devices 130 (each of which may be a network protector), and transformers 342 that provide power to the loads 103. The area network 301 may include tens of redundant feeders 304 and switch devices 130, and the loads 103 may include tens, hundreds, or thousands of loads. The switch devices 130 are controlled by the controller 150.

FIGS. 1, 2, and 3 are provided as examples, and the controller 150 may be used with distribution networks having other configurations. For example, the distribution system 101 may have more than two feeders and may be fed by more than two independent AC power sources. The distribution network 201 may have fewer or more than four parallel low-voltage feeders.

Figure 4:
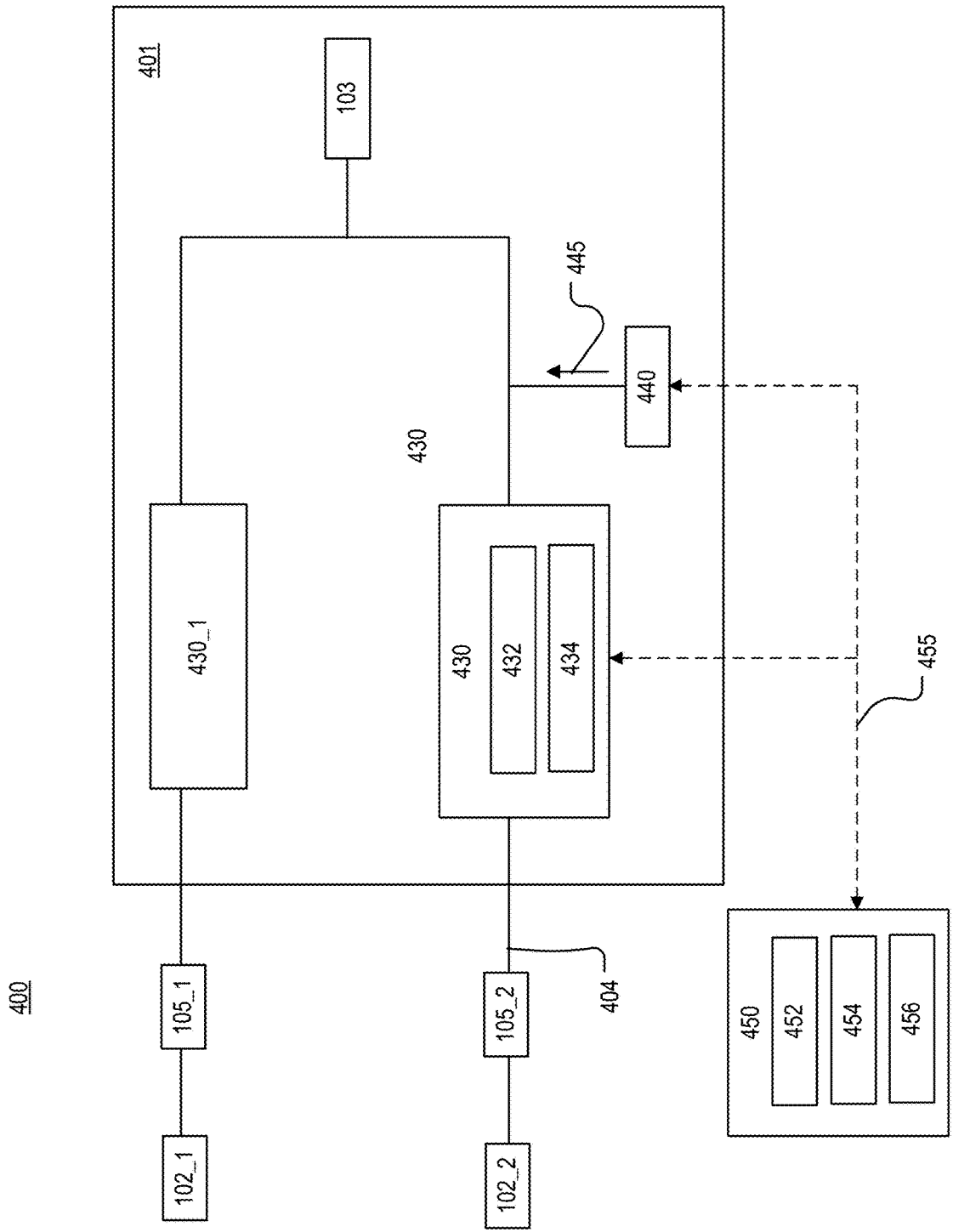
FIG. 4 is a block diagram of another example of an electrical power system.

FIG. 4 is a block diagram of a controller 450 in a power system 400 that includes a distribution network 401. The controller 450 is an example of an implementation of the controller 150. The distribution network 401 may be a medium-voltage distribution network or a low-voltage secondary distribution network. The distribution network 401 includes a plurality of feeders. In the example of FIG. 4, two feeders are shown and one is labeled as feeder 404. A switch device 430 is coupled to the feeder 404. The distribution network 401 includes additional switch devices 430 coupled to the other feeders. In the example of FIG. 4, an additional switch device is labeled as 430_1.

The switch device 430 may be a single-phase or multi-phase switch device. The switch device 430 includes a resettable switching apparatus 432 and a sensing system 434. The switch device 430 is coupled to the controller 450. The controller 450 is shown as being separate from the switch device 430. However, in some implementations, the controller 450 is included in the switch device 430. For example, the controller 450 and the switch device 430 may be contained together in the same housing. The switch device 430 is electrically connected to the feeder 404.

The resettable switching apparatus 432 is any type of switch that is capable of opening and closing the feeder 404. The resettable switching apparatus 432 is configured for repeated operation. For example, after the resettable switching apparatus 432 opens the feeder 404 to stop or prevent current flow, the resettable switching apparatus 432 is able to close the feeder 404 such that current flow in the feeder 404 resumes. The resettable switching apparatus 432 also may include additional components and systems such as actuators, motors, springs, levers, and/or driving electronics that facilitate the operation of the switching apparatus 432.

In some implementations, the feeder 404 is a high-voltage or medium-voltage feeder, and the switch device 430 is configured to open and close such a feeder. For example, the switch device 430 may be a switchgear or a recloser. In these implementations, the resettable switching apparatus 432 may be a plurality of electrically conductive contacts that are joined to close the feeder 404 and separated to open the feeder 404. For example, the resettable switching apparatus 432 may include a first electrical contact and a second electrical contact configured to move relative to the first electrical contact to open and close the feeder 404. The resettable switching apparatus 432 may be a vacuum interrupter or a high-voltage or medium voltage circuit breaker.

In some implementations, the feeder 404 is a low-voltage feeder that is in a secondary electrical distribution network. In these implementations, the switch device 430 may be, for example, a network protector or other switch device configured for low-voltage use. In implementations in which the switch device 430 is a network protector, the resettable switching apparatus 432 may be an air circuit breaker operated by relay that monitors the voltage across the open contacts and the current through the closed contacts. An air circuit breaker includes two electrical contacts that operate in air at atmospheric pressure. When the electrical contacts are joined, current can flow in the feeder 404. When the electrical contacts are separated, current cannot flow in the feeder 404.

The switch device 430 also includes a sensing system 434. The sensing system 434 includes one or more detectors or sensors, each of which is configured to sense one or more properties of the electrical current in the feeder 404. The sensing system 434 may include any type of current sensor, such as, for example, a current transformer (CT) or a Rogowski coil. Alternately or additionally, the sensing system 434 may include one or more voltage sensors and/or one or more power sensors. The sensing system 434 may include a relay.

The switch device 430 also includes a controller 450. The controller 450 is coupled to the switch device 430 and to a test generation device 440 via a communication path 455. The communication path 455 may be any type of wired and/or wireless path capable of transporting signals, information, and/or data. For example, the communication path 455 may be a control cable, a wire, and/or an Ethernet or other network cable.

Figure 6A:
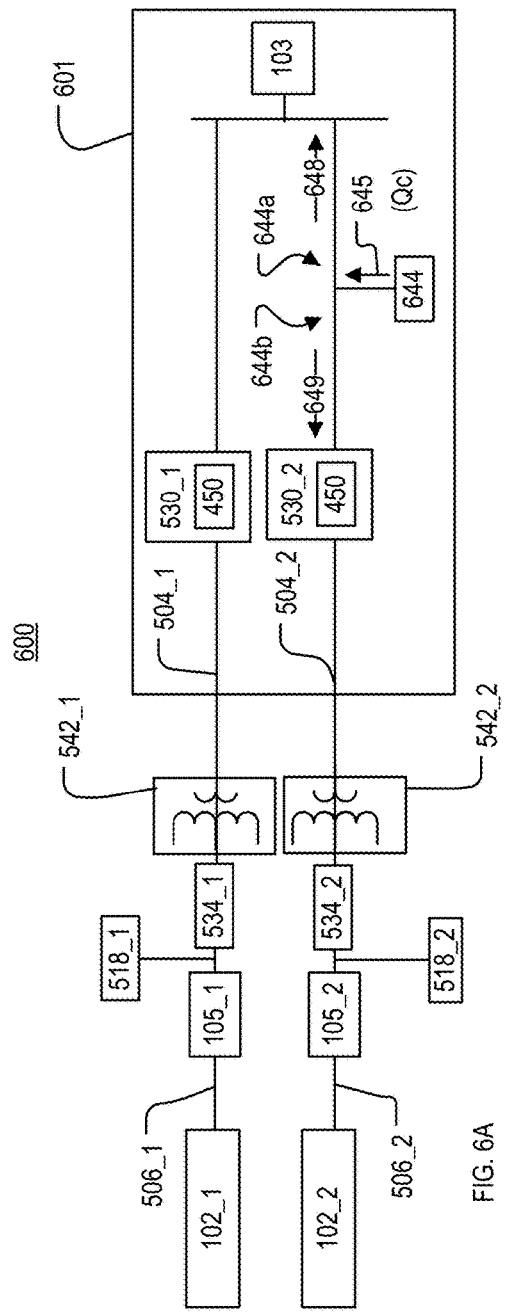
FIGS. 6A and 6B are block diagrams of another example of an electrical power system.
Figure 6B:
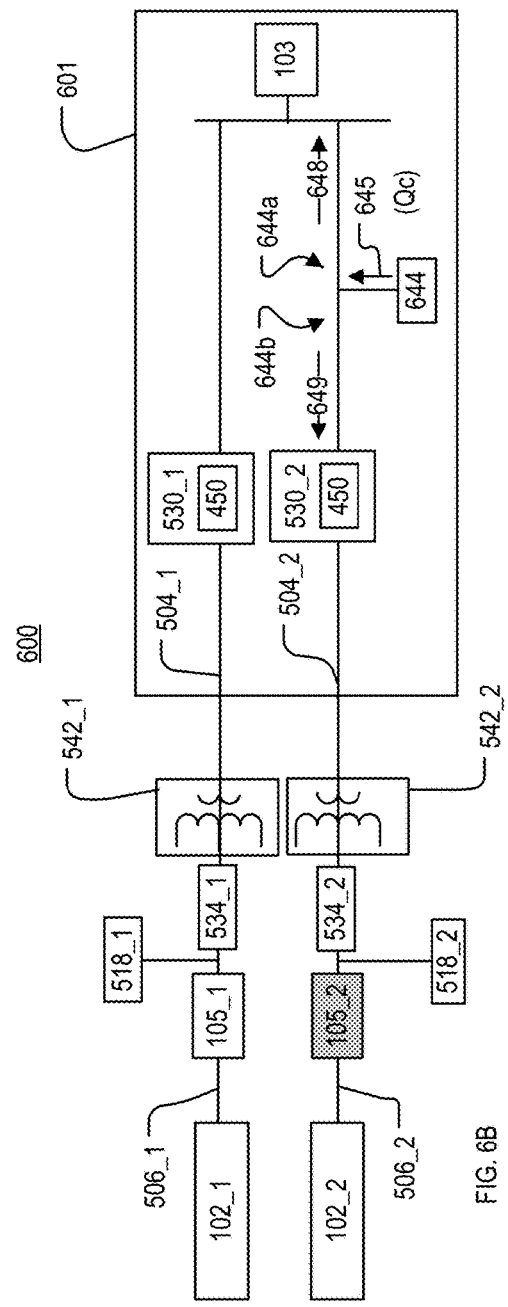

The test generation device 440 may be, for example, a device capable of injecting reactive power, such as the reactive power generation apparatus 644 of FIGS. 6A and 6B, or a device capable of changing the amount of voltage on the feeder 404, such as the distribution transformer 542_1 of FIG. 5A, a voltage regulator, or any other device or apparatus that includes a tap changer. The reactive power generation apparatus 664 may be, for example, a capacitor bank, power electronic switches, a power converter, and/or an inverter. The test generation device 440 is electrically connected to the feeder 404, however, the test generation device 440 is not necessarily connected between the switch device 430 and the loads 103 as shown in FIG. 4. Moreover, although the test generation device 440 is shown as being distinct from the switch device 430, in some implementations, the test generation device 440 is integrated with the switch device 430. For example, the test generation device 440 may be housed within a unit or container that also houses the resettable switching apparatus 432

The controller 450 is an electronic controller that includes an electronic processing module 452, an electronic storage 454, and an input/output (I/O) interface 456. The electronic processing module 452 includes one or more electronic processors, each of which may be any type of electronic processor and may or may not include a general purpose central processing unit (CPU), a graphics processing unit (GPU), a microcontroller, a field-programmable gate array (FPGA), Complex Programmable Logic Device (CPLD), and/or an application-specific integrated circuit (ASIC).

The electronic storage 454 may be any type of electronic memory that is capable of storing data and instructions in the form of computer programs or software, and the electronic storage 454 may include volatile and/or non-volatile components. The electronic storage 454 and the processing module 452 are coupled such that the processing module 452 can access or read data from and write data to the electronic storage 454.

The electronic storage 454 stores executable instructions, for example, as a computer program, logic, or software, that cause the processing module 452 to perform various operations. For example, the electronic storage 454 stores executable instructions that cause the processing module 452 to determine the structure of the distribution network 401 using the process 700 of FIG. 7. To provide another example, the electronic storage may store instructions that cause readings from the sensing system 434 to be stored on the electronic storage 454. The instructions also may include instructions that compare the readings obtained by the sensing system 434 at different times to determine whether one or more properties of the electrical power in the feeder 404 change over time. The properties include, for example, the direction of current flow on the feeder 404, magnitude of voltage on the feeder 404, phase angle of voltage on the feeder 404, magnitude of current on the feeder 404, phase angle of current on the feeder 404, active power on the feeder 404, reactive power on the feeder 404, or impedance at a known point on the feeder 404.

The electronic storage 454 also may store information about the switch device 430 and/or the feeder 404, such as one or more threshold values used for determining whether a change has occurred in one or more measured properties. For example, as discussed above, the electronic storage 454 may store instructions that determine whether one or more measured properties on the feeder 404 changes over time. In this example, if the magnitude of the measured voltage on the feeder 404 changes by at least the voltage change threshold over the associated time, the controller 450 produces an indication that the voltage magnitude has changed. Thresholds for other properties also may be stored on the electronic storage 454. Moreover, the threshold may be expressed as a percentage change that is stored on the electronic storage 454. The same percentage change may be used as a threshold for all measured properties, or each measured property may have a different threshold. In some implementations, threshold values or threshold percentage changes may be entered into the controller 450 via the I/O interface 456.

Furthermore, the electronic storage 454 may store instructions that, when executed, cause the electronic processing module 452 to send the test generation device 440 a command signal that causes the test generation device 440 to generate a test signal 445 and provide the test signal 445 to the feeder 404. The electronic storage 454 also may store instructions that cause the electronic processing module 452 to analyze values of one or more properties of electrical power on the feeder 404 and/or in a power system that includes the feeder 404 after controlling the test generation device 440.

Furthermore, the electronic storage 454 may include instructions that implement techniques for filtering and/or preparing the data produced by the sensing system 434. For example, the electronic storage 454 may include instructions that implement an analog-to-digital (A/D) converter that digitizes analog data from the sensing system 434.

Additionally, the electronic storage 454 may store instructions related to the operation of the switch device 430. For example, the electronic storage 454 may store instructions, that when executed by the processing module 452, cause the controller 450 to issue a command to the switch device 430 such that the switch device 430 opens or closes. Moreover, the electronic storage 454 may store information related to the conditions under which the switch device 430 is to be opened or closed. For example, the electronic storage 454 may store a threshold value that represents a maximum acceptable difference between the network-side and source-side voltage vectors to allow the switch device 430 to transition from the open state to the closed state, as discussed with respect to FIG. 8.

The I/O interface 456 may be any interface that allows a human operator and/or an autonomous process to interact with the controller 450. The I/O interface 456 may include, for example, a display (such as a liquid crystal display (LCD)), a keyboard, audio input and/or output (such as speakers and/or a microphone), visual output (such as lights, light emitting diodes (LED)) that are in addition to or instead of the display, serial or parallel port, a Universal Serial Bus (USB) connection, and/or any type of network interface, such as, for example, Ethernet. The I/O interface 456 also may allow communication without physical contact through, for example, an IEEE 802.11, Bluetooth, or a near-field communication (NFC) connection. The controller 450 may be, for example, operated, configured, modified, or updated through the I/O interface 456.

The I/O interface 456 also may allow the controller 450 to communicate with systems external to and remote from the switch device 430. For example, the I/O interface 456 may include a communications interface that allows communication between the controller 450 and a remote station (not shown), or between the controller 450 and a separate electrical apparatus in the power system 100 (FIG. 1) using, for example, the Supervisory Control and Data Acquisition (SCADA) protocol or another services protocol, such as Secure Shell (SSH) or the Hypertext Transfer Protocol (HTTP). The remote station may be any type of station through which an operator is able to communicate with the controller 450 without making physical contact with the switch device 430 or the controller 450. For example, the remote station may be a computer-based work station, a smart phone, tablet, or a laptop computer that connects to the controller 450 via a services protocol, or a remote control that connects to the controller 450 via a radio-frequency signal. The controller 450 may communicate information such as the determined tap position through the I/O interface 456 to the remote station or to a separate device in the power system 400.

As discussed above, the test generation device 440 may be a reactive power generation apparatus or a distribution transformer. FIG. 5A shows an example that includes distribution transformers 542_1 and 542_2. FIGS. 6A and 6B shows an example that includes a reactive power generation apparatus 644.

FIG. 5A is a block diagram of a power system 500. The power system 500 includes distribution network 501. In the example of FIG. 5A, the distribution network 501 is a low-voltage secondary distribution network that includes low-voltage feeders 504_1 and 504_2. The distribution network 501 is fed by the first source 102_1 and the second source 102_2. The first source 102_1 feeds a first medium-voltage feeder 506_1, and the second source 102_2 feeds a second medium-voltage feeder 506_2. The first and second medium-voltage feeders 506_1 and 506_2 include respective circuit breakers 105_1 and 105_2. The system 500 also includes medium-voltage loads 518_1 and 518_2, which are respectively connected to the medium-voltage feeders 506_1 and 506_2.

The power system 500 also includes network protectors 530_1 and 530_2. The network protector 530_1 controls an electrical connection between the low-voltage feeder 504_1 and the loads 103. The network protector 530_2 controls an electrical connection between the low-voltage feeder 504_2 and the loads 103. Each network protector 530_1 and 530_2 includes an instance of the controller 450.

FIG. 5C is a block diagram of the network protector 530_1. The network protector 530_1 includes a resettable switching apparatus 532, a sensor system 534, and a relay or switch control 535. The resettable switching apparatus 532 may be, for example, an air circuit breaker. The sensing system 534 is configured to measure voltage and/or current in the respective low-voltage feeder 504_1. The sensing system 534 may include, for example, a current sensor that measures current in the low-voltage feeder 504_1, a first voltage sensor that measures voltage between the source side of the network protector 530_1 and the load side of the network protector 530_1, and a second voltage sensor that measures voltage between the low-voltage feeder 504_1 and ground or other reference potential. The relay 535 controls the state of the switching apparatus 532 based on measurements from the sensing system 534. The network protector 530_2 is configured in the same manner. Any type of sensor capable of measuring voltage and/or current may be used in the sensing system 534. The current sensor may be, for example, a current transformer (CT) or Rogowski coil. The voltage sensor may be, for example, a potential transformer (PT).

The system 500 also includes distribution transformers 542_1 and 542_2, which are substantially identical to each other. FIG. 5B shows the distribution transformer 542_1 in greater detail. The transformer 542_1 includes a primary winding 543a and a secondary winding 543b that are magnetically coupled by a core 541. The primary winding 543a and the secondary winding 543b are made of an electrically conductive material such as, a metal or a metal alloy, for example, copper or a copper alloy. The primary winding 543a is on a primary or source side of the transformer 542_1, and the secondary winding 543b is on a secondary side of the transformer 542_1.

The core 541 is made of a ferromagnetic material, such as, for example, iron or steel. The core 541 may be a gapped core or an un-gapped core. In implementations in which the core 541 is an un-gapped core, the core 541 is a contiguous segment of ferromagnetic material. A gapped core includes a gap that is not ferromagnetic material. The gap may be, for example, air, nylon, or any other material that is not ferromagnetic. Thus, in implementations in which the core 541 is a gapped core, the core includes at least one segment of a ferromagnetic material and at least one segment of a material that is not a ferromagnetic material.

Referring also to FIG. 5B, the primary winding 543a includes T taps 546, where T is an integer number that is greater than one. The taps 546 are made of an electrically conductive material (such as, for example, metal), and the taps 546 are electrically connected to the primary winding 543a. Each tap is separated from the nearest other tap, with at least one turn being between any two adjacent taps. During operational use of the distribution transformer 542_1, there is a potential difference V_T between any two adjacent taps 546.

The medium-voltage feeder 506_1 is electrically connected to a tap selector 547. The tap selector 547 is made from an electrically conductive material and is configured to electrically connect the medium-voltage feeder 506_1 to one of the taps 546. The amount of voltage provided to the medium-voltage feeder 506_1 depends on which of the taps 546 the tap selector 547 is connected to, thus, the controller 450 is able to change the voltage on the low-voltage distribution feeder 504_1 by a known amount by moving the tap selector 547 from one of the taps 546 to another one of the taps 546.

The controller 450 in each network protector 530_1 and 530_2 receives data from respective source-side monitors 534_1 and 534_2. The source-side monitors 534_1 and 534_2 may be sensors that are configured to measure, for example, the voltage and/or other electrical properties on the primary side of the transformers 542_1 and 542_2. In some implementations, the source-side monitors 534_1 and 534_2 are part of the respective transformers 542_1 and 542_2.

During normal operation of the power system 500, the medium-voltage circuit breakers 105_1 and 105_2 are closed, and the feeders 504_1 and 504_2 of the secondary distribution network 501 form a mesh or loop structure. The voltage at the primary side of the transformers 542_1 and 542_2 is dictated by the sources 102_1 and 102_2, respectively. Performing a tap change operation by moving the tap selector 547 to another tap does not change the voltage at the primary side of the transformers 542_1 and 542_2.

During abnormal operating conditions, the circuit breaker 105_1 or 105_2 opens, for example, due to a fault or scheduled maintenance, and the secondary distribution network 501 has a radial structure. When the secondary distribution network 501 has a radial structure, the voltage at the primary side of the transformers 542_1 and 542_2 depends on the voltage drop due to the loading on the secondary side. Thus, under an abnormal condition, a tap change operation changes the voltage on the primary side of the transformers 542_1 and 542_2. In the implementation shown in FIG. 5A, the source-side monitors 534_1 and 534_2 are used to monitor the voltage on the primary side of the respective transformers 542_1 and 542_2.

By performing a tap change operation and then monitoring the response to that tap change operation, the controller 450 is able to determine whether or not an abnormal condition exists in the distribution network 501. Moreover, the controller 450 may determine that the distribution network 501 is operating in an expected or normal condition even if there is reverse power flow on the feeder 504_1 and/or the feeder 504_2.

In some implementations, the controller 450 monitors one or more properties or parameters of electrical power in the feeder 504_1. A significant change in one or more of the monitored properties or parameters triggers the controller 450 to issue a tap change test command to the distribution transformer 542_1 to perform a tap change operation to generate the test signal 545. The voltage at the primary side of the distribution transformer 542_1 is analyzed based on data from the source-side monitor 534_1. If the voltage at the primary side of the distribution transformer 542_1 changes, the controller 450 determines that the feeder 504_1 has a radial structure and thus is in an abnormal condition. The controller 450 issues a command that causes the network protector 530_1 to open such that the feeder 504_1 is disconnected from the loads 103. If the voltage at the primary side of the distribution transformer 542_2 does not change, the feeder 504_1 has a mesh structure and is in a normal or expected operating condition. The network protector 530_1 remains closed.

The feeder 504_2 (and any other feeders in the distribution network 501) may be monitored and analyzed in the same manner. Moreover, in some implementations, the controllers 450 also control the reclosing, or closing after opening, of the network protector 530_1 and 530_2 using, for example, the process 800 discussed with respect to FIG. 8.

FIG. 6A is a block diagram of a power system 600. The power system 600 is similar to the power system 500 (FIG. 5A), except the power system 600 also includes a reactive power generation apparatus 644. The reactive power generation apparatus 644 may be any device or system that is capable of producing a test signal 645 that has a known amount of reactive power (Qc). Reactive power is the product of the voltage and current that is out-of-phase with each other. For example, the reactive power generation apparatus 644 may be a capacitor bank, an inductor bank, a bank of devices that includes inductors and capacitors, a power converter, or an inverter. The reactive power generation apparatus 644 is coupled to the controller 450 and is configured to be controlled by the controller 450. For example, the controller 450 may be configured to generate command signals that cause the reactive power generation apparatus 644 to inject the test signal 645 into the distribution network 601.

In the example shown in FIG. 6A, the reactive power generation apparatus 644 is electrically connected to the low-voltage feeder 504_2 between the loads 103 and the network protector 530_2. However, other implementations are possible. For example, the reactive power generation apparatus 644 may be between the distribution transformer 542_1 and the switch device 530_1. In another example, the reactive power generation apparatus 644 may be integrated with the network protector 530_2. Furthermore, the system 600 also may include an additional reactive power generation apparatus connected to the low-voltage feeder 504_1.

As discussed below, the test signal 645 is observed on a first side 644a and/or a second side 644b of the reactive power generation apparatus 644 to determine the structure of the distribution network 601.

FIG. 6A shows the power system 600 during normal or expected operating conditions. During normal and expected operation of the power system 600, the circuit breakers 105_1 and 105_2 are closed, the feeders 504_1 and 504_2 of the secondary distribution network 601 form a mesh or loop structure and, based on Kirchoff's Current Law (KCL), the reactive power (Qc) in the test signal 645 is divided into a first reactive power 648 that flows toward the loads 103 and a second reactive power 649 that flows toward the transformer 542_2. Under normal or expected operating conditions, the amount of reactive power in 648 and 649 depends on the impedance of the path toward the loads 103 and the path toward the transformer 542_2, respectively.

FIG. 6B shows the power system 600 during an abnormal condition after the circuit breaker 105_2 has opened due to, for example, a fault or scheduled maintenance. In FIG. 6B, the circuit breaker 105_2 is in grey shading to indicate that it is open. During abnormal conditions, the feeder 504_2 and the network 601 have a radial structure. According to Kirchoff's Current Law (KCL), in a radial structure, the injected reactive power Qc (the test signal 645) becomes the source of reactive power on the second side 644b side of the reactive power generation apparatus 644. Therefore, during abnormal conditions, the reactive power flow on the second side 644b of reactive power generation apparatus 644 remains constant before and after the injection of the test signal 645, while the reactive power flow on the source side of the reactive power generation apparatus 644 (the first side 644a in the example of FIG. 6B) changes by Qc, which is the amount of reactive power in the test signal 645.

Thus, to determine the structure of the distribution network 601, the reactive power is observed on the first side 644a and/or the second side 644b of the reactive power generation apparatus 644 before and after the test signal 645 is injected. For example, if the reactive power 648 on the source side of the reactive power generation apparatus 644 changes by Qc after injection of the test signal 645, the distribution network 601 has a radial structure. If the reactive power 648 on the source side of the reactive power generation apparatus 644 does not change by Qc after the injection of the test signal 645, the distribution network 601 has a mesh or loop structure. Alternatively or additionally, the reactive power 649 on the second side 644b of the reactive power generation apparatus 644 may be observed. If the reactive power 649 on the second side 644b side (the load side in this example) does not change in response to injection of the test signal 645, the distribution network 601 has a radial structure. If the reactive power 649 on the second side 644b changes in response to injection of the test signal 644b, the distribution network 601 has a mesh or loop structure. The reactive power on either side of the reactive power generation apparatus 644 may be measured by the sensing system 534 or by a separate sensor (not shown).

In some implementations, the controller 450 monitors one or more properties or parameters of the electrical power in the feeder 504_1. A significant change in at least one of the monitored properties or parameters triggers the controller 450 to issue a command to the reactive power generation apparatus 644 and the test signal 645 is generated and injected into the feeder 504_2. Furthermore, if the controller 450 determines that the network 601 has a radial structure, the controller 450 opens the network protector 530_2. Such an implementation is discussed below with respect to FIG. 7. Moreover, in some implementations, the controllers 450 also control the reclosing, or closing after opening, of the network protectors 530_1 and 530_2 using a process such as the process 800 discussed with respect to FIG. 8.

Figure 7:
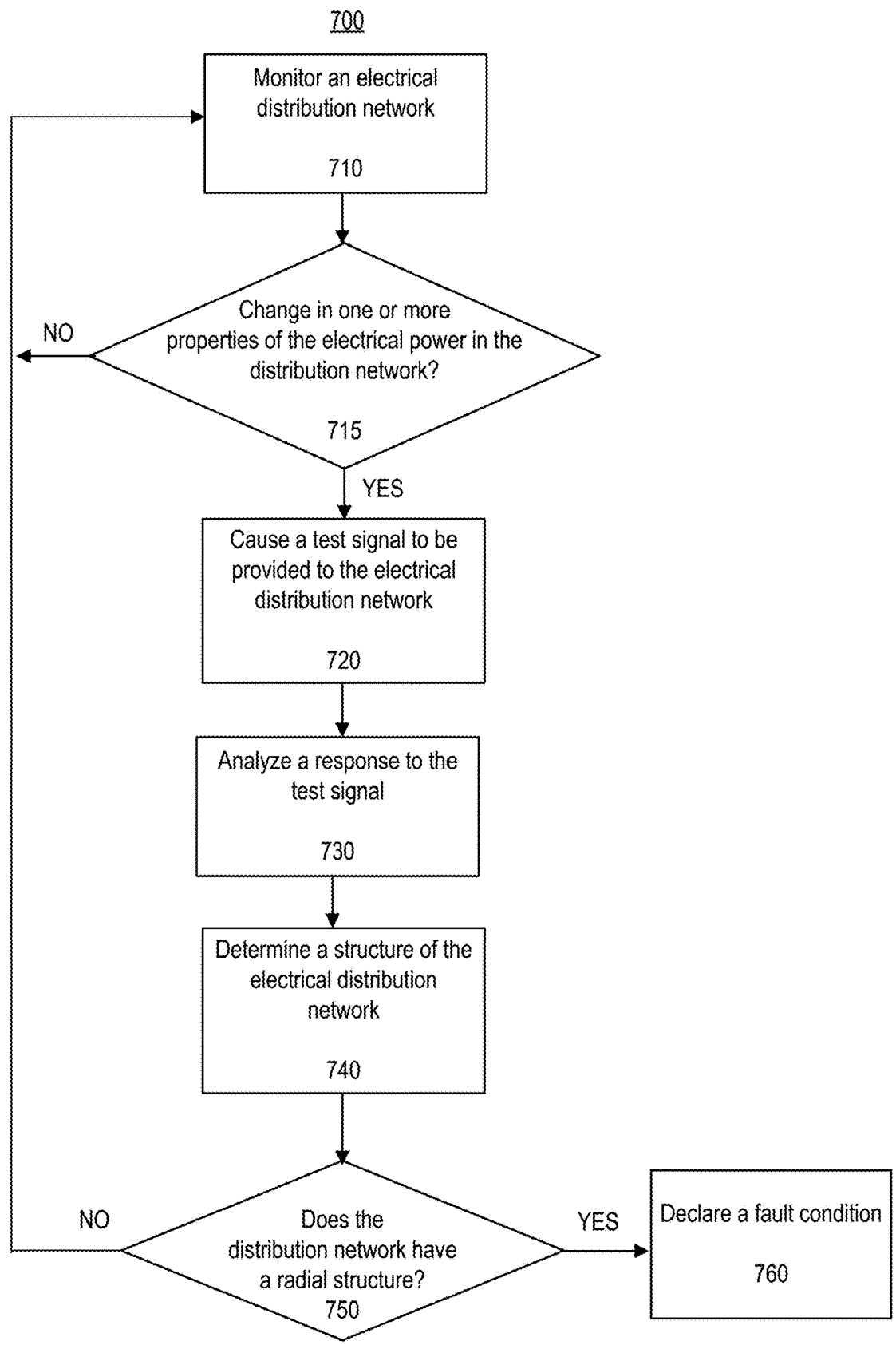
FIG. 7 is a flow chart of an example of a process for determining the structure of a distribution network.

FIG. 7 is a flow chart of a process 700. The process 700 is an example of a process for determining the structure of a distribution network. The process 700 may be used to determine the structure of any of the distribution networks 101, 201, 301, 401, 501, and 601 discussed above. Moreover, the process 700 may be used to determine the structure of other distribution networks. The process 700 may be performed by the controller 150 or the controller 450. The process 700 is discussed with respect to FIG. 4 for the purposes of providing an example.

The distribution network 401 is monitored (710). For example, and referring to FIG. 4, the sensing system 434 continuously monitors properties and parameters of the voltage and/or current on the feeder 404 and the measured data is stored on the electronic storage 454.

Whether or not a change in one or more monitored properties of the electricity in the network 401 is determined (715). The electronic storage 454 includes executable instructions that compare the measured data over time to determine whether one or more properties of the power flow in the feeder 404 has changed over a particular time period. The time period may be, for example, 1 millisecond (ms) to 10 seconds (s). The properties may be any measured or derived property and include, without limitation, amplitude and/or phase angle of voltage and/or current, reactive power, impedance, active power, impedance, and/or current flow direction.

To provide a specific example, the sensing system 434 may be configured to measure the magnitude of current flow in the feeder 404 every 5 ms, and the controller 450 may be configured to determine the amount of change between each measurement or between every other measurement. In this way, the controller 450 determines the amount of change in the measured current magnitude over a specified time period. The controller 450 compares the determined amount of change to a threshold related to that property. Continuing the example of current magnitude, the controller 450 is configured to compare the change in the current magnitude to a pre-determined current magnitude threshold.

To provide another example, the property may be the direction of current flow on the feeder 404. A change in direction is considered a change in a property, but is not assumed by the controller 450 to necessarily indicate the presence of an abnormal condition. Moreover, the electronic storage 454 may store a threshold or a specification related to the current direction property. For example, the threshold may specify a period of time over which the direction is reverse (toward the source) before the direction of current flow is determined to have changed.

If none of the changes exceed a threshold, there has not been a change in one or more properties at (715), the process 700 returns to (710) and continues to monitor the feeder 404.

If the change exceeds the threshold, then the controller 450 determines that there has been a change in an electrical property, and the process 700 moves to (720). In some implementations, the controller 450 only detects that a change in an electrical property has occurred if the amount of change of more than one property exceeds the appropriate threshold for that property.

The controller 450 causes the test generation device 440 to generate the test signal 445, which is provided to the feeder 404 (720). In implementations in which the test generation device 440 is a distribution transformer (such as shown in FIG. 5A), the controller 450 causes the tap selector 547 to move to a different one of the taps 546. In implementations in which the test generation device 440 is a reactive power generation apparatus (such as shown in FIGS. 6A and 6B), the controller 450 causes the device 440 to generate the test signal 445 by providing a known amount of reactive power to the feeder 404.

In some implementations, the controller 450 causes the test signal to be produced without performing (710) and (715). For example, an operator of the system 400 may manually trigger the generation of the test signal 445 by communicating with the controller 450 through the I/O interface 456. In other words, the process 700 may be performed without performing (710) and (720), and the generation of the test signal 445 may be triggered by events other than a change in a monitored electrical property.

After providing the test signal 445 to the feeder 404, the controller 450 analyzes the response to the test signal 445 (730). For example, if the test signal is the reactive power test signal 645, the controller 450 determines whether the reactive power changes on either side of the device 444. In another example, if the test signal is the tap change voltage 545, the controller 450 determines whether the voltage on the primary side of the transformer 542_1 changes.

The controller 450 determines the structure of the electrical distribution network 401 (740). The analysis for determining the structure of the distribution networks 501 and 601 discussed above with respect to FIGS. 5A, 6A, and 6B are additional examples of (740).

If the distribution network 401 has a radial structure (750), the controller 450 declares a fault (760). The controller 450 may declare a fault by producing a perceivable indicator at the I/O interface 256. The controller 450 also issues a command signal to the switch device 430 that causes the switch device 430 to open to thereby disconnect the feeder 404 from the loads 103. For example, in the abnormal condition shown in FIG. 6B, the controller 450 would control the network protector 530_2 to open after determining that a radial structure existed. If the distribution network 401 does not have a radial structure (750), then the process 700 ends or returns to (710) to continue monitoring the feeder 404.

Figure 8:
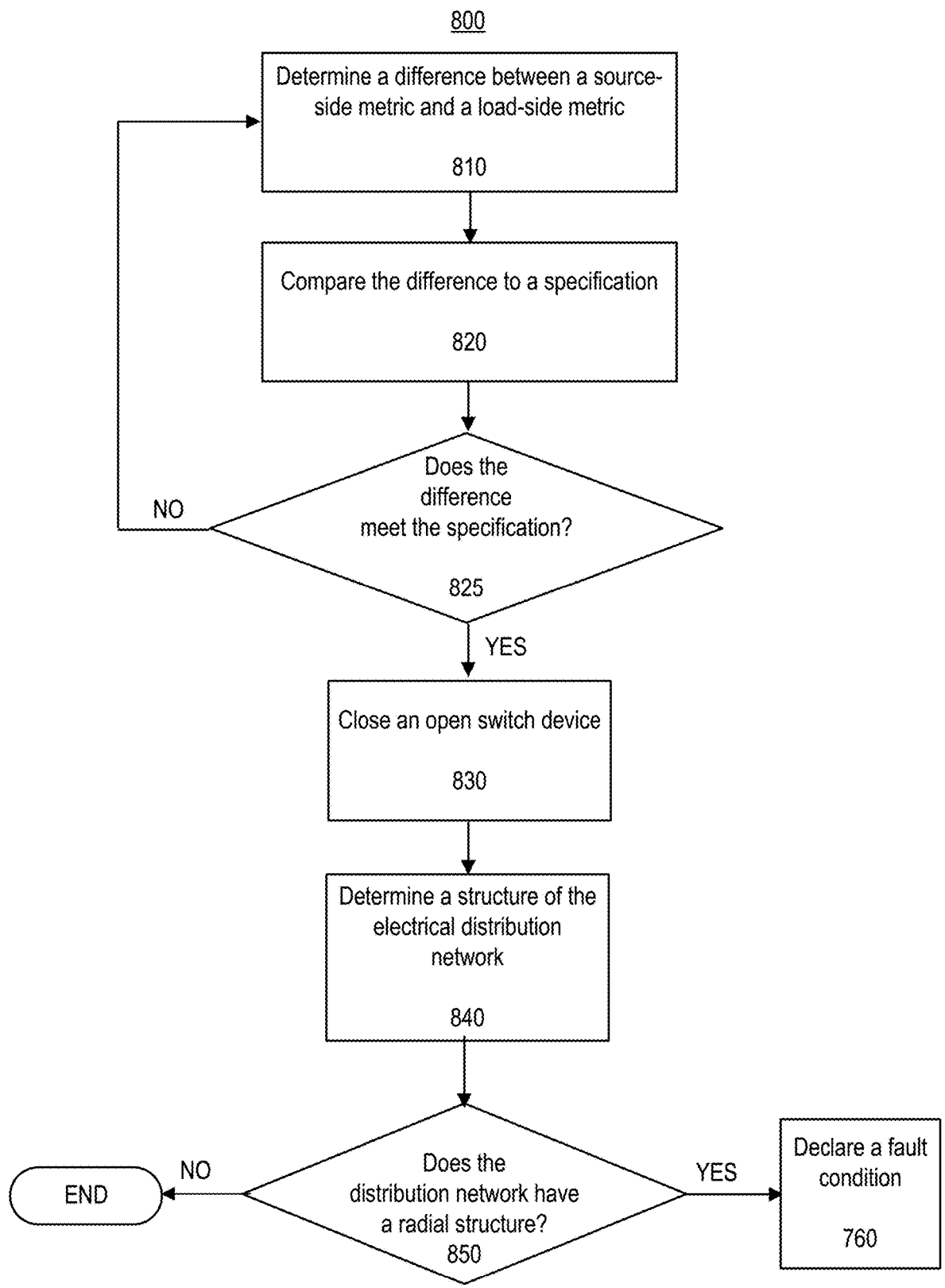
FIG. 8 is a flow chart of an example of a process for reclosing or closing an open switch device.

FIG. 8 is a flow chart of a process 800. The process 800 is an example of a process for reclosing or closing an open switch device. The process 800 may be performed by the controller 150 or the controller 450 and with any of the switch devices discussed above. To provide an example, the process 800 is discussed with respect to reclosing the network protector 530_2 of FIG. 6B. As discussed above, FIG. 6B illustrates an abnormal condition. The network protector 530_2 is opened after determining that the network 601 has a radial structure.

As noted above, in traditional network protectors, forward power flow (from source to load) is typically a required condition to reclosing a switch device. However, the configuration of the controller 450 allows reclosing even in the presence of reverse flow. In other words, forward power flow is not required for reclosing the network protector 530_2. The controller 450 first checks the distribution transformer 542_2 to determine whether or not it is energized and the loads 103 to determine whether or not the loads 103 have voltage. If the distribution transformer 542_2 is energized and the loads 103 have voltage, the controller 450 determines a magnitude of a difference (Vtn) between a voltage vector (Vt) on the primary side of the transformer 542_2 and a voltage vector (Vn) on the network side of the transformer 542_2 (810), and determines if the magnitude of the difference is within an acceptable limit (820) according to Equation 1:

$$|Vtn| < \text{threshold} \qquad \text{Equation (1)},$$

where Vtn=Vt−Vn, and threshold is the maximum allowable difference between the voltage vectors Vt and Vn. The threshold may be stored on the electronic storage 454 or provided through the I/O interface 456. The threshold value is a numerical value and may be, for example, 135 V.

If the magnitude of the voltage difference is greater than the threshold (825), the network protector 530_2 is not closed, and the process 800 returns to (810).

If the magnitude of the voltage difference is less than the threshold (825), the controller 450 issues a close command to the network protector 530_2 (830), and the reclose action is performed. The reclose action may take, for example, 1 minute, 2 minutes, or 5 minutes.

After the reclose action is complete, the controller 450 may issue a command to the reactive power generation apparatus 644 to issue the test signal 645 (840). The controller 450 may then analyze the response to the test signal 645 as discussed above to confirm that the feeder 504_2 and the distribution network 601 are in the loop or mesh configuration. If the distribution network 601 has the loop or mesh structure, the process 800 ends or enters (710) of the process 700 to begin monitoring for an abnormal condition. If the distribution network 601 has a radial structure, the controller 450 declares a fault condition (760). Other network protectors in the distribution network 601 may be reclosed in the same manner. Furthermore, the process 800 may be used to reclose switch devices in any of the distribution networks 101, 201, 301, 401, and 501.

Figure 9:
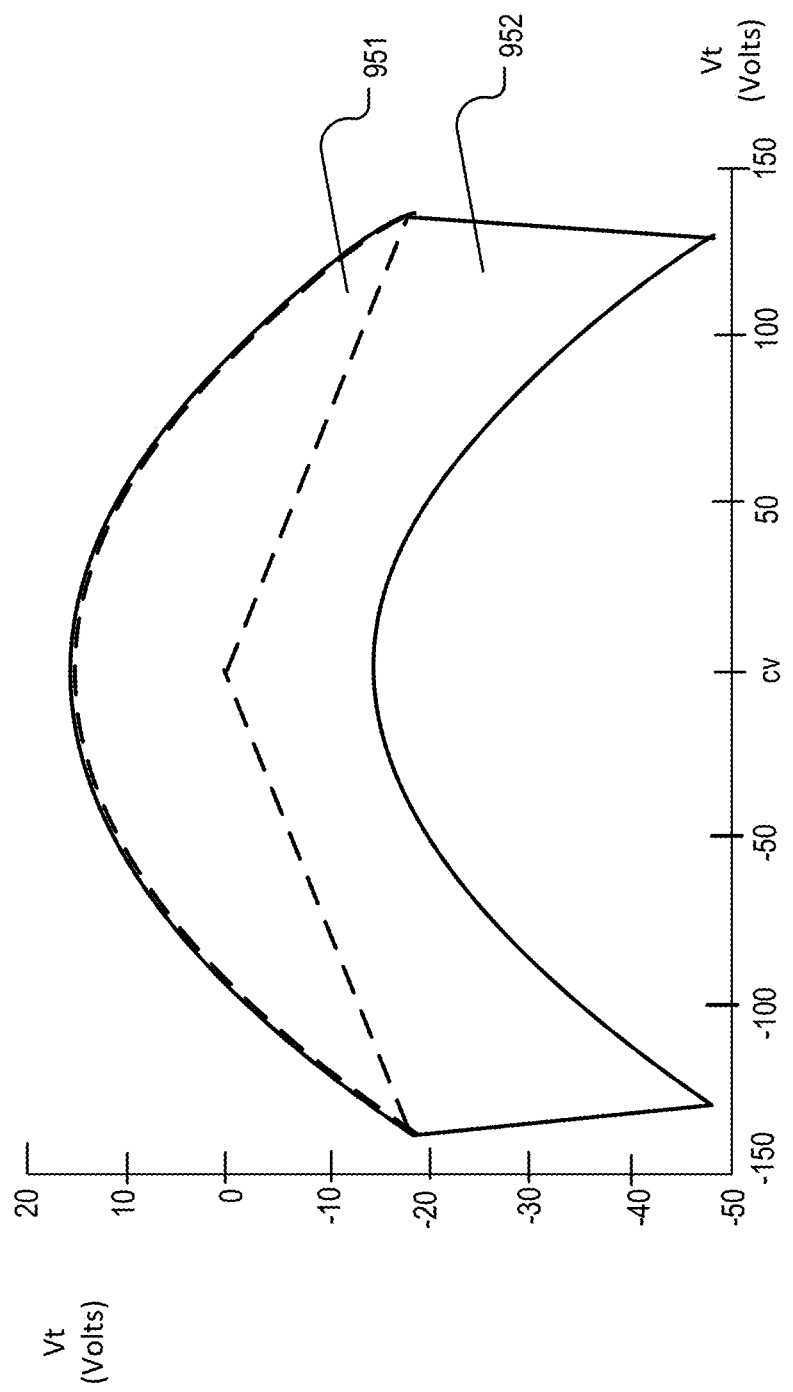
FIG. 9 is a plot of reclose zones.

FIG. 9 shows reclose zones 951 and 952. The reclose zone 951 is outlined in a dashed line style and is for a traditional network protector, which is controlled by a traditional controller that assumes an abnormal condition is present if there is reverse power flow. In other words, the reclose zone 951 is for a system that does not include the controller 450. The reclose zone 952 is outlined in a solid line style and is for the network protector 530_2, which is controlled by the controller 450. In FIG. 9, the x-axis (horizontal axis) represents the voltage vector (Vt) measured at the primary side of the distribution transformer 542_2, and the y-axis (vertical axis) represents the voltage vector (Vn) on the secondary or network side of the distribution transformer 542_2. The reclose zone 952 is defined by all of the differences between Vt and Vn that are less than a threshold. The reclose zone 951 is determined by traditional criteria.

If the measured voltage vector Vn at a particular time and the measured voltage vector Vn measured at that time fall inside the reclose zone 952, then the controller 450 issues a command to the network protector 530_1 to close. As shown in FIG. 9, the reclose zone 952 is larger than the reclose zone 951 and the reclose zone 952 also substantially overlaps the reclose zone 951. Accordingly, as compared to the traditional configuration, the configuration of the controller 450 allows more opportunities to reclose the network protector 530_2 and thus improves overall performance. The network protector 530_1 has a reclose zone that is similar to the reclose zone 952.

FIGS. 10A-10D and FIGS. 11A-11D show examples of data from simulations of a spot network with 20% photovoltaic (PV) penetration. The spot network was fed by two separate and independent substations (Substation 1 and Substation 2). Substation 1 had a voltage magnitude 2 V greater than Substation 2, and the voltage produced by Substation 1 lagged the voltage produced by Substation 2 by 2 degrees.

FIGS. 10A-10D show data from a simulation in which the spot network included two network protectors (NWP_36 and NWP_47) configured in a traditional manner and configured to trip in the presence of reverse power flow. FIGS. 11A-11D show data from a simulation in which the same secondary electrical distribution network included two network protectors configured in a manner similar to the network protectors 130_1 and 130_2, 430, 530_1 or 530_2.

In other words, FIGS. 11A-11D show data from a simulation in which the network protectors allow reverse power flow if there is no fault or other abnormal condition. The simulated system also included medium-voltage circuit breakers BRK_GA05, which was between Substation 1 and NWP_36, and BRK_GA02, which was between Substation 2 and NWP_47.

Figures 10A, 10B, 10C, 10D:
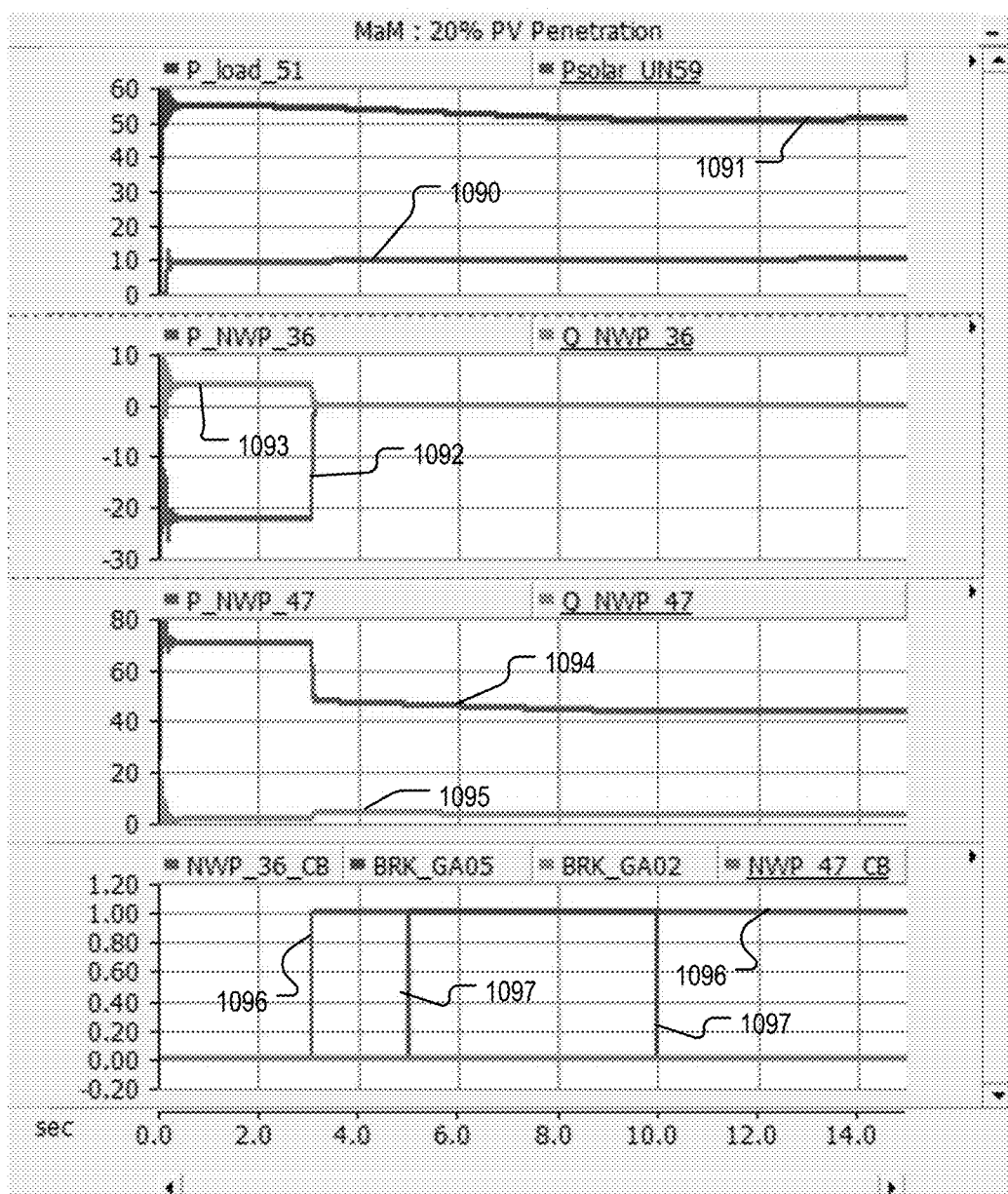
FIGS. 10A-10D show examples of simulated data.

FIGS. 10A-10D show unintentional tripping of the traditionally configured network protectors due to reverse power flow that arises due to the angle and voltage difference between Substation 1 and Substation 2. FIG. 10A shows generated PV power (1090) and the power demand of the load (1091) as a function of time. FIG. 10B shows real (1092) and reactive power (1093) at the network protector NWP_36 as a function of time. FIG. 10C shows real (1094) and reactive power (1095) at the network protector NWP_47 as a function of time. FIG. 10D shows the state of NWP_36 (1096), BRK_GA05 (1097), and NWP_47 (1096), with a value of one (1) indicating open and a value of zero (0) indicating closed. FIGS. 10A-10D have the same time axis.

Referring to FIG. 10A, a circulating current flows in the spot network due to the voltage difference between Substation 1 and Substation 2. The circulating current flows in reverse in the NWP_36, and the NWP_36 trips even though there is no fault condition. As shown in FIG. 10D, the NWP_36 trips before the associated medium-voltage circuit breaker (MVCB) opens, and the NWP_36 fails to reclose after the MVCB recloses at time t=10 s. Thus, the traditionally configured NWP_36 and NWP_47 cannot be used in a network fed by multiple independent AC sources.

FIGS. 11A-11D show the operation of the same secondary spot network except the NWP_36 and NWP_47 included logic configured to determine the structure of the secondary network (such as the logic in the controller (450). FIG. 11A shows the shows generated PV power (1190) and the power demand of the load (1191) as a function of time. FIG. 11B shows real (1192) and reactive power (1193) at the network protector NWP_36 as a function of time. FIG. 11C shows real (1194) and reactive power (1195) at the network protector NWP_47 as a function of time. FIG. 11D shows the state of NWP_36 (1196) and BRK_GA05 (1197), with a value of one (1) indicating open and a value of zero (0) indicating closed. FIGS. 10A-10D have the same time axis.

As shown in FIG. 11B, there is reverse power flow through the NWP_36 at time t=0 s due to the angle and amplitude difference between the voltage produced by the Substation 1 and the Substation 2. The reverse power flow is detected, and a capacitor bank is controlled to produce a test signal. The test signal is injected and distributed on both sides of the bank, indicating that the spot network has a loop or mesh structure, and the NWP_36 and NWP_47 are not opened. At time t=5 s, the MVCB GA05 (1197 in FIG. 11D) corresponding to Substation 1 and NWP_36 is opened, and there is a sudden change in the power through the NWP_36 and the NWP_47. The capacitor bank is again controlled to produce a test signal, which is reflected entirely on the load side (on the side of the open MVCB BRK_GA05), indicating that the MVCB GA05 is open and the structure of the spot network is radial. Thus, the reverse power is undesirable and the NWP_36 is opened at about t=6.5 s. The reclosing criteria according to Equation 1 is evaluated. The NWP_36 is reclosed when the criteria is satisfied.

Thus, the NWP_36 and NWP_47 configured with a control system such as the controller 450 are able to distinguish between reverse power caused by circulating current and reverse power caused by a fault or other abnormal condition. Additionally, the NWP_36 and NWP_47 configured with a control system such as the controller 450 are able to successfully reclose in a spot network fed by two independent sources.

These and other implementations are within the scope of the claims.

What is claimed is:

1. A system for an electrical distribution network comprising a plurality of feeders, at least one of which is configured to be fed by a separate electrical source than at least one other of the plurality of feeders, the system comprising:
   a switch device comprising:
      a resettable switching apparatus, wherein the resettable switching apparatus is configured to control an electrical connection between a first electrical feeder of the electrical distribution network and a load; and
   a controller configured to:
      determine, after a test signal is provided to the electrical distribution network, whether the electrical distribution network has a radial structure; and
      if the electrical distribution network has the radial structure, open the resettable switching apparatus to disconnect the load from the first electrical feeder of the electrical distribution network.

2. The system of claim 1, wherein the switch device further comprises a sensor configured to measure one or more electrical properties of electrical power in the first electrical feeder, and
   the controller is further configured to:
      determine whether there is a change in at least one measured electrical property; and
      if there is a change in the at least one electrical property, cause the test signal to be provided to the electrical distribution network.

3. The system of claim 2, wherein the one or more electrical properties comprise any of current flow direction, voltage magnitude, voltage phase angle, active power, reactive power, and impedance.

4. The system of claim 1, wherein the controller is further configured to cause the test signal to be provided to the electrical distribution network by controlling a distribution transformer electrically connected to the first electrical feeder to perform a tap change operation, and
   the controller being configured to determine whether the electrical distribution network has the radial structure comprises the controller comparing a voltage on a source side of the distribution transformer after the tap change operation to the voltage on the source side of the distribution transformer before the tap change operation.

5. The system of claim 4, wherein the tap change operation is associated with a tap step voltage,
   if the voltage on the source side changes by the tap step voltage, the electrical distribution network is determined to have the radial structure, and
   if the voltage on the source side does not change by the tap step voltage, the electrical distribution network is determined to have a mesh structure.

6. The system of claim 4, further comprising the distribution transformer.

7. The system of claim 1, wherein the controller is further configured to cause the test signal to be provided to the first electrical feeder by controlling a reactive power generation apparatus to inject the test signal into the electrical distribution network, the test signal having a known amount of reactive power; and the controller being configured to determine whether the electrical distribution network has the radial structure comprises the controller being configured to: compare an amount of reactive power on a first side of the reactive power generation apparatus after the test signal is provided to the first electrical feeder to an amount of reactive power on the first side of the reactive power generation apparatus before the test signal was provided.

8. The system of claim 7, wherein if the reactive power on the first side of the reactive power generation apparatus changes by the known amount of reactive power, the electrical distribution network is determined to have the radial structure; and if the reactive power on the first side of the reactive power generation apparatus does not change by the known amount of reactive power, the electrical distribution is determined to have a mesh structure.

9. The system of claim 7, wherein if the reactive power on the first side of the reactive power generation apparatus does not change, the electrical distribution network is determined to have the radial structure; and if the reactive power on the first side of the reactive power generation apparatus changes, the electrical distribution is determined to have a mesh structure.

10. The system of claim 7, further comprising the reactive power generation apparatus.

11. The system of claim 10, wherein the reactive power generation apparatus is a capacitor bank or an inverter.

12. The system of claim 1, wherein the controller is further configured to:

determine whether the resettable switching apparatus is open;

if the resettable switching apparatus is open, compare a magnitude of a voltage vector on a source side of a distribution transformer to a magnitude of a voltage vector on a network side of the distribution transformer; and determine whether to close the resettable switching apparatus based on the comparison.

13. The system of claim 1, wherein the switch device is a network protector, and the resettable switching apparatus is configured to control an electrical connection between a distribution transformer and the first electrical feeder;

the electrical distribution network comprises a secondary electrical distribution network; and the controller is configured to determine whether the secondary electrical distribution network has a radial structure, and, if the secondary electrical distribution network has the radial structure, the controller causes the resettable switching apparatus to open.

14. The system of claim 1, wherein the switch device is a switchgear.

15. The system of claim 1, wherein the load comprises one or more distributed energy resources.

16. The system of claim 1, wherein the first electrical feeder comprises a medium-voltage electrical feeder, and the resettable switching apparatus is configured to control the electrical connection between the medium-voltage electrical feeder and the load.

17. A switch device comprising:

a resettable switching apparatus, wherein the resettable switching apparatus is configured to control an electrical connection between a first electrical feeder of an electrical distribution network and a load, wherein the electrical distribution network receives alternating current (AC) electrical power from at least two independent AC power sources; and a controller configured to:
 cause a test signal to be provided to the first electrical feeder;
 determine, after a test signal is provided to the first electrical feeder, whether the electrical distribution network has a radial structure; and
 if the electrical distribution network has the radial structure, open the resettable switching apparatus to disconnect the load from the first electrical feeder of the electrical distribution network.

18. The switch device of claim 17, wherein the switch device comprises a network protector.

19. The switch device of claim 17, wherein the switch device comprises a recloser or a switchgear configured for use in a medium-voltage or high-voltage network.

20. A method of determining a structure of an electrical distribution network fed by at least two independent alternating current (AC) electrical power sources, the method comprising:

causing a test signal to be provided to a first electrical feeder of an electrical distribution network;

analyzing a response of the electrical distribution network to the test signal to determine a structure of the electrical distribution network; and declaring an abnormal condition in the electrical distribution network if the determined structure is a radial structure.

* * * * *